United States Patent [19]
Koopman, Jr.

[11] Patent Number: 5,696,828
[45] Date of Patent: Dec. 9, 1997

[54] RANDOM NUMBER GENERATING SYSTEM AND PROCESS BASED ON CHAOS

[75] Inventor: Philip J. Koopman, Jr., Hebron, Conn.

[73] Assignee: United Technologies Automotive, Inc., Dearborn, Mich.

[21] Appl. No.: 532,337

[22] Filed: Sep. 22, 1995

[51] Int. Cl.[6] .................................................. H04L 9/00
[52] U.S. Cl. ................................. 380/46; 364/224.21
[58] Field of Search ........................ 380/46; 364/224.21, 364/717; 331/78

[56] References Cited

U.S. PATENT DOCUMENTS

| | | |
|---|---|---|
| 4,424,414 | 1/1984 | Hellman et al. . |
| 4,810,975 | 3/1989 | Dias . |
| 4,853,884 | 8/1989 | Brown et al. . |
| 5,007,087 | 4/1991 | Bernstein et al. ............... 380/46 |
| 5,048,086 | 9/1991 | Bianco et al. . |
| 5,363,448 | 11/1994 | Koopman, Jr. et al. . |
| 5,398,284 | 3/1995 | Koopman, Jr. et al. . |
| 5,432,697 | 7/1995 | Hayes ............................. 380/46 |
| 5,434,806 | 7/1995 | Hofverberg . |
| 5,506,796 | 4/1996 | Yamakawa ..................... 380/46 |

FOREIGN PATENT DOCUMENTS

| | | |
|---|---|---|
| 6029969 | 4/1994 | Japan . |
| 2113879 | 8/1983 | United Kingdom . |

OTHER PUBLICATIONS

Bernstein, G.M. et al. "Secure Random Number Generation Using Chaotic Circuits", IEEE Transactions On Circuits and Systems, vol. 37, No. 9, 1 Sep. 1990, pp. 1157–1164, XP000170797.

Hardy, D.A. et al. "Random Number Generator", Motorola Inc., Technical Developments, vol. 14, 1 Dec. 1991, p. 36, XP000276144.

Rivest, R.L. "The Impact of Technology on Cryptography", ICC '78, Toronto, Canada, Conference Record, vol. 3, pp. 46.2.1–46.2.4, Jun. 1978.

Davis, D. et al., "Cryptographic Randomness from Air Turbulence in Disk Drives", Advances in Cryptology (CRYPTO), Santa Barbara, Aug. 21–25, 1994, NR. Conf. 14, pp. 114–120, Desmedt YG XP000467657 Article dated: Aug. 21, 1994.

Ritter, T., "The Efficient Generation of Cryptographic Confusion Sequences", Cryptologia, vol. 15, No. 2, Apr. 1991, USA, pp. 81, 100–102, 108, 116, 117. XP000647031.

IBM Technical Disclosure Bulletin, vol. 34, No. 7B, 1 Dec. 1991, pp. 316–318, "Random Numbers Produced Via a Technique Employing Both a White Noise Generator and the Data Encryption Algorithm". XP000282592.

IBM Technical Disclosure Bulletin, vol. 31, No. 7, Dec. 1988, pp. 147/148, "Programmable Masking for Protection Keys". XP000035620.

Lih–Yuan Deng et al. "Combining Random Number Generators", 8 Dec. 1991, Proceedings of the 1991 Winter Simulation Conference XP000347679.

*Primary Examiner*—David C. Cain
*Attorney, Agent, or Firm*—Ozer M. N. Teitelbaum

[57] ABSTRACT

The present invention teaches a method of generating a plurality of random numbers is disclosed. The method comprises the initial step of generating chaotic noise. Subsequently, the chaotic noise is sampled such that a plurality of samples are created. Each sample of the plurality of samples is then converted into digital data such that each converted sample corresponds with a random number of the plurality of random numbers.

29 Claims, 4 Drawing Sheets

RANDOM NUMBER GENERATING SYSTEM AND PROCESS BASED ON CHAOS

FIELD OF THE INVENTION

The present invention relates to cryptography, and more particularly to a process and system for generating random numbers based on chaos.

BACKGROUND OF THE INVENTION

Pseudo-random number generators are well known in the cryptographic sciences. Cryptography is defined as the art and science of preventing eavesdroppers from understanding the meaning of intercepted messages. In such security minded applications, pseudo-random as well as truly random number generators can be used to support the encryption and decryption of information. These number generators are commonly employed for two separate purposes: 1) to generate "secret key" information to be used as either a shared secret key or public+private key set for cryptographic encoding and decoding of information, and 2) to generate a stream of numbers that is used to obscure message contents.

In a secret key application, a small set of secret numbers is used as a cryptographic key for encoding as well as decoding messages. It is vitally important that this key not be known by unauthorized parties, nor discernible via cryptanalysis to unauthorized parties based on knowledge of messages. Thus, it is desirable to use a sequence of apparently random numbers in order to manufacture a plurality of secret keys. We define an "apparently random" number as a number within a sequence of numbers such that there is no practicable way to reconstruct that particular number's value nor substantially narrow the set of possible values of that particular number, even given access to the algorithms, equipment, and all other numbers in the sequence.

An inexpensive manufacturing process for secret keys poses special requirements on generating random or pseudo-random numbers. In particular:

1) Only widely available off-the-shelf equipment may be used in order to minimize procurement, maintenance, and repair costs;
2) It must not be possible to reproduce the sequence of numbers used to create the secret keys, and even by the manufacturer while in full possession of all equipment and algorithms used in the process; and
3) There must be a guarantee of no duplicate secret keys ever being generated and, at the same time, no record of the actual key values may be retained by the manufacturer.

The crux of the manufacturing process is inexpensively creating a stream of apparently random numbers. This description concentrates on the application of generating apparently random numbers for "secret key" creation, with the understanding that the discussion applies equally to generating any stream of apparently random numbers, such as that used by traditional one-time pad/Vernam cypher encryption techniques.

A traditional way to create apparently random numbers in low-security applications is to use pseudo-random number generators. Pseudo-random numbers are created using a deterministic algorithm. The goal of an ordinary pseudo-random number generator is to produce a sequence of apparently random numbers, assuming that any potential adversary has neither access nor desire to understand the generating algorithm. Pseudo-random numbers can serve as an approximation to truly random numbers for a limited set of purposes, and are commonly available used in simulations and games. Typical pseudo-random number generators are based on linear feedback shift registers or linear congruential generators (often implemented in software). Given the algorithm and current state (e.g., values of computer software variables), pseudo-random number generator output can be exactly replicated. Because this information may be obtained by inspecting one or a few values in a sequence, ordinary pseudo-random number generators are unsuitable for our purposes.

Cryptographically secure pseudo-random number generators are special pseudo-random number generators that have been designed to resist attempts to determine the current state via examination of the generated random number stream. They typically assume that the adversary has complete access to the algorithm, but not to the current state values. Such generators are, however, deterministic. Therefore, if security of the current state is breached by cryptanalysis or other method, all numbers created by the generator in the future (and, in many designs, the past) may be deduced. Work in this field has traditionally assumed that the legitimate owner of the generator can be trusted not to reveal or exploit knowledge of the current generator state. However, a defecting employee or industrial espionage may compromise a cryptographically secure generator, so it is unsuitable for our purposes.

A "truly random" sequence of numbers is one in which there is a theoretical basis for stating that no mathematical nor scientific method can predict the next number in the sequence given an arbitrarily long past history of the sequence behavior. In particular, there is absolutely no pattern, correlation, nor dependency between numbers in the sequence other than chance patterns. Generation of truly random sequences typically requires physical measurement of quantum mechanical uncertainty such as radioactive decay. While truly random numbers perfect for use as apparently random numbers, measurement equipment of this sort is not readily available. Also, there is a low probability, but no guarantee, against subsequences of random numbers repeating.

"Chaotically" generated numbers can be created by repeated experimental trials using a chaotic system with quantized outcomes, such as a coin or set of dice. In a chaotic system, outcomes vary greatly and nonlinearly according to minute variations of initial experimental conditions. Therefore small sources of experimental error that are inevitably present in the physical world are magnified to the point that it is impracticable to correlate system outputs (numbers) with available measurements of system inputs (initial conditions). Generating large volumes of chaotic experimental results has in the past required special-purpose hardware such as a nonlinear oscillator, which is not readily available. Furthermore, there is no guarantee that chaotically generated random numbers will not repeat due to either chance or unexpected biases within the experimental apparatus.

One approach to generate apparently random number generators has been to utilize deterministic mathematical algorithms that compute simulations of chaotic systems. Because such simulations are computed using exactly specified numbers representing initial conditions, the source of apparent randomness due to minute variation of initial conditions is lost when performing simulations instead of physical experiments. Therefore, these approaches are deterministic and therefore vulnerable and subject to attack and compromise if the particular chaotic formula being used becomes known (for example, by examining the relevant patent) or deduced by cryptanalysis. Similarly, several pseudo-random number generators are known to be based on algorithmic-based recursion formulas, and are also subject to compromise.

Often, strategies employed in pseudo-random number generator designs have relied upon specialized digital hardware. One such method uses a linear feedback shift register ("LFSR") for obtaining an n-bit pseudo-random number by serially shifting out n bits from the shift register or shift register chain during a substantially long period outside the purview of potential eavesdroppers. For example, a sixty-four (64) bit maximal length LFSR running at a clocked frequency of 1 MHz could be sampled every few seconds to approximate a random number stream and be guaranteed not repeat to itself for 585,000 years. However, the LFSR approach is still deterministic. As such, as all future and past states can be predicted when the present state of the shift register is known. For example, purchase and reverse-engineering of a single manufactured unit to determine its secret key value would allow intelligent guessing of the values of other units manufactured in the same or proximate batches.

As a result of these problems and in view of the growth of cryptographic applications, a demand exists for a random number generator which is not deterministic, can be implemented with commonly available equipment, and which is guaranteed not to generate duplicate secret keys. A need further exists for such a random number generator from which results cannot be duplicated, even by the designer or secret key manufacturer.

For the remainder of this document, we shall use the unqualified term "random number" to denote an apparently random number. While it is understood that truly random number generation is not being discussed, apparently random numbers are considered "random" for our purposes.

DISCLOSURE OF THE INVENTION

The primary advantage of the present invention is to overcome the limitations of the prior art.

Another advantage of the present invention is to provide a method and system for generating a number stream that, using the most advanced cryptanalytic and statistical methods available, is indistinguishable from a truly random number stream.

Another advantage of the present invention is to provide a method and system for generating random numbers which is non-deterministic.

Another advantage of the present invention is to provide a method and system for guaranteeing that no particular subsequence of random numbers or derivative value is used twice while at the same time eliminating vulnerabilities associated with keeping records of values generated.

A further advantage of the present invention is to provide a method and system for generating random numbers which is immune to attack and compromise, even from the manufacturer of the random numbers.

Yet still another advantage of the present invention is to provide a method and system for generating random numbers which utilizes the apparently random nature of chaotic systems generally.

In order to achieve the advantages of the present invention, a method of generating a plurality of random numbers is disclosed. The method comprises the initial step of generating chaotic noise. Subsequently, the chaotic noise is sampled such that a plurality of samples are created. Each sample of the plurality of samples is then converted into digital data such that each converted sample corresponds with a random number of the plurality of random numbers. In an alternate embodiment of the present invention, a plurality of samples correspond with a single random number.

Furthermore, a system of generating a plurality of random numbers is also disclosed. The system comprises a chaotic noise generator for generating chaotic noise, and a recording device for sampling the chaotic noise such that a plurality of samples are created. Moreover, a digitizer is incorporated for converting each sample of the plurality into digital data such that each converted sample of the plurality corresponds with a random number of the plurality of random numbers. In an alternate embodiment of the present invention, a plurality of samples correspond with a single random number.

These and other advantages and objects will become apparent to those skilled in the art from the following detailed description read in conjunction with the appended claims and the drawings attached hereto.

BRIEF DESCRIPTION OF THE DRAWINGS

The present invention will be better understood from reading the following description of non-limitative embodiments, with reference to the attached drawings, wherein below.

It should be emphasized that the drawings of the instant application are not to scale but are merely schematic representations and are not intended to portray the specific parameters or the structural details of the invention, which can be determined by one of skill in the art by examination of the information herein.

DETAILED DESCRIPTION OF THE INVENTION

Figure 1:
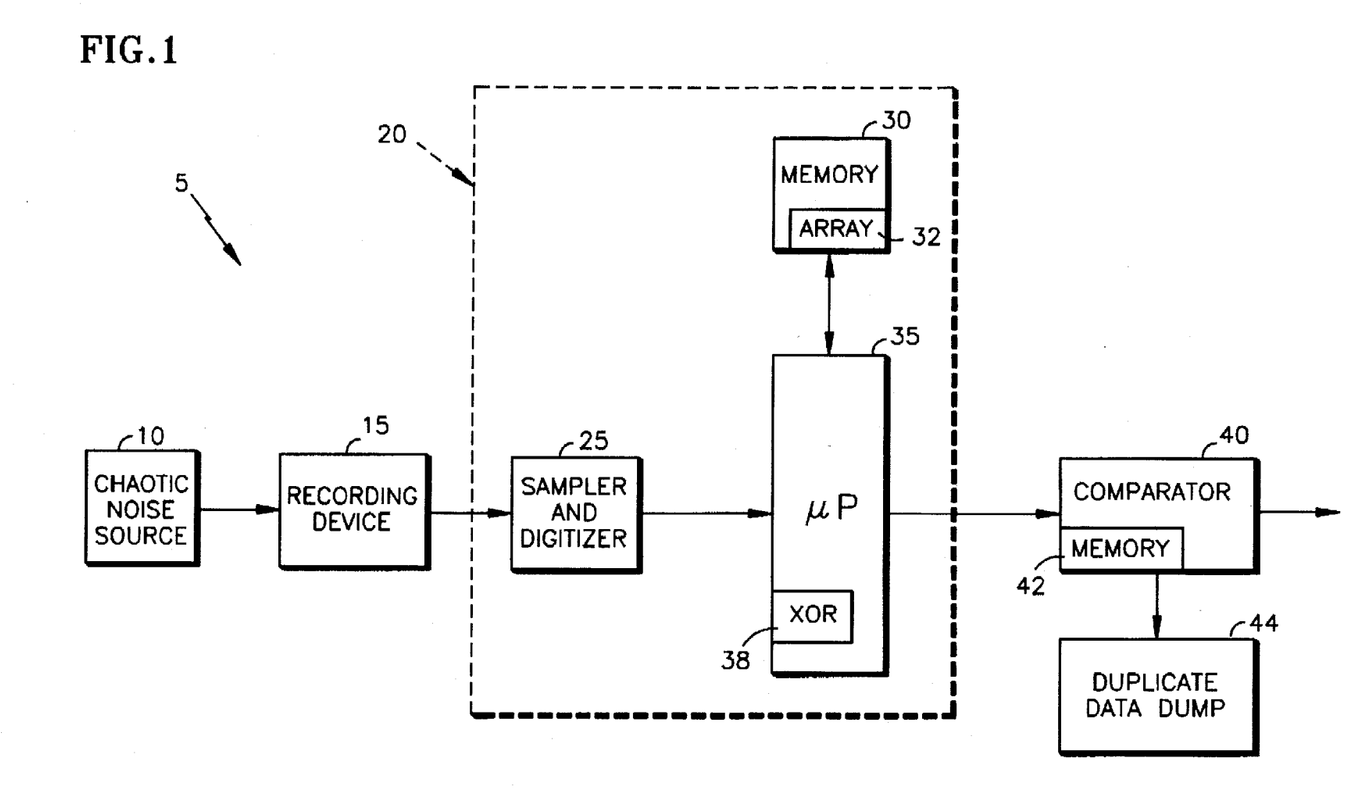
FIG. 1 illustrates a block diagram of the preferred embodiment of the present invention.

Referring to FIG. 1, a block diagram of the preferred embodiment of the present invention is illustrated depicting a system 5 for generating a plurality for random numbers. As will become evident upon understanding the present disclosure, and the preferred embodiment particularly, system 5 randomly generates a sequence of secret identification numbers, hereinafter referred to as "IDs." Each ID generated is associated with a fob of a remote keyless entry system. To improve and ensure the security of such an entry system, cryptographic security is incorporated to substantially restrict the opportunity to compromise any random ID generated by system 5.

To realize the aim of generating random IDs, system 5 comprises a chaotic noise source 10 for generating chaotic noise. In one embodiment, chaotic noise source 10 comprises an electromechanical generator for generating turbulent air flow. Turbulent air flow comprises characteristics that may be classified as randomly occurring in nature, as opposed to those elements having a pseudo randomness resulting from simulated chaos created by deterministic mathematics. In the preferred embodiment of the present invention, the turbulent air flow output of the chaotic noise generator 10 is generated by a small, high-air-volume, generically "noisy" fan because it provides turbulent air flow and creates noise that is inherently chaotic. It should be apparent that a spectrally pure noise source, such as a pure sinusoidal tone, is highly undesirable.

System 5 further comprises a recording device 15 for capturing the unique spatial perspective of the recording device 15. Recording device 15 records the chaotic noise output generated by chaotic noise source 10, as well as the ambient noise and any other extraneous sounds, such as fan motor noise, uniquely present at its particular spatial coordinates. In the preferred embodiment, recording device 15 comprises a microphone positioned in reasonably proximate distance to the chaotic noise source 10 for recording the air flow around the microphone. It should be apparent to one of ordinary skill in the art that the relevant amplitudes of the sounds and noises recorded by recording device 15 when combined with self-noise from turbulent air flow over and around recording device 15, are unique, and as such, may not be reproduced as the coordinates of the device 15 are inhabited by only one spatial element.

Once the chaotic noise generated by source 10 is recorded by device 15, the resultant recorded sound is fed into a computer 20, and more particularly sampler and digitizer 25. Sampler and digitizer 25 performs two functions. First, sampler and digitizer 25 samples the resultant recorded sound recorded by recording device 15 at a predetermined frequency. In the preferred embodiment, the predetermined frequency is lower than the operating frequency of the fan generating the turbulent chaotic noise.

As a result of sampling the recorded sound, sampler and digitizer 25 generates a plurality of samples. The plurality of samples are then digitized by an analog to digital converter, such that each sample is converted into a digital data set, which in one embodiment comprises 8 bits. In the preferred embodiment of the present invention, both functions of sampler and digitizer 25 are realized by a personal computer ("PC") sound card, such as for example the Sound Blaster® AWE 32 sound card.

Figure 2:
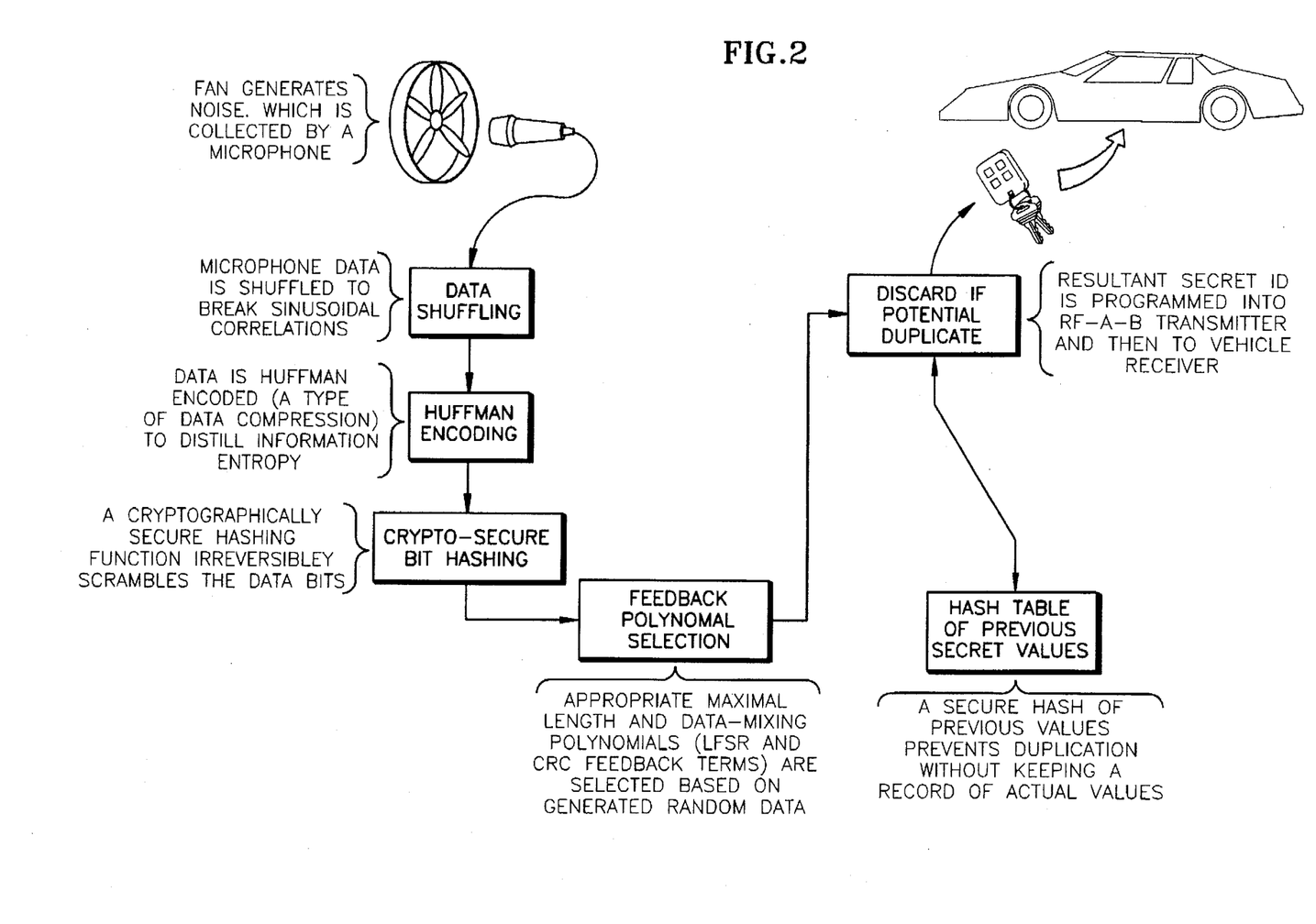
FIG. 2 illustrates a high-level overview flowchart of the preferred embodiment of the present invention.

Moreover, system 5 additionally comprises a microprocessor/microcontroller 35 and a memory 30. Microprocessor 35 performs a series of algorithmic functions stored in memory 30 for obscuring the random numbers generated, insuring the randomness of the random numbers generated, encrypting the random numbers to prevent reverse engineering, as well as reducing correlations between samples. As a result of performing these algorithmic functions, as overviewed in FIG. 2, a random number output is generated.

It should also be apparent to one of ordinary skill in the art that while these algorithmic functions are derailed as being performed serially by a microprocessor, several may be performed in some parallel manner. Likewise, the order for which these functions may be performed may be variously arranged. However, it should be to one of ordinary skill that either of these options presents diminished and/or substandard random number generation.

Figure 3:
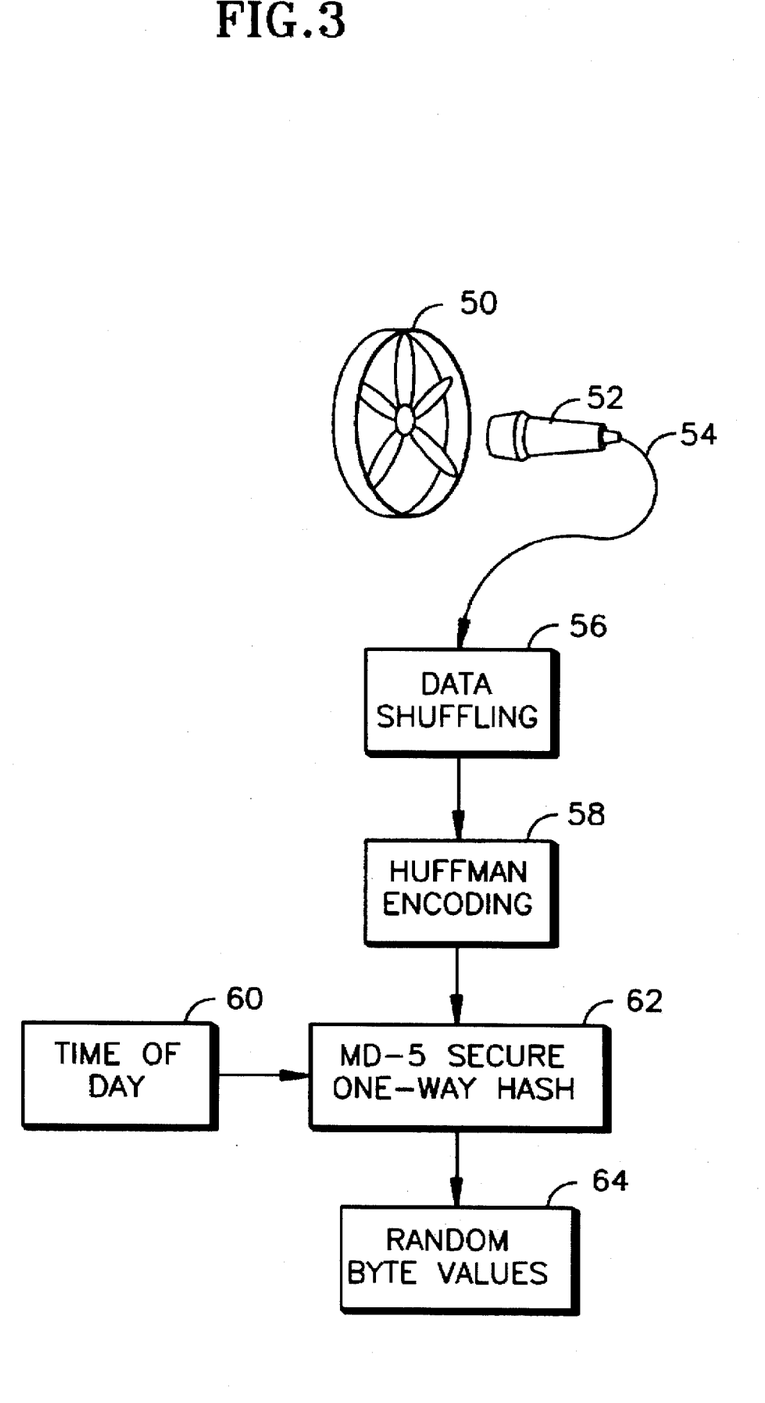
FIG. 3 illustrates a more detailed flowchart of the first several steps of the preferred embodiment of the present invention.

Referring to FIG. 3, the derailed steps of the preferred embodiment for generating a stream of apparently random numbers. The first function performed by microprocessor 35 is the algorithmic step of shuffling each data set. Upon receiving a digital data set of each converted sample, microprocessor 35 positions the digital data set into a data array 32—which in the preferred embodiment is 8 Kbytes in size—using a stride for obscuring sampling correlations between converted samples. It is known that data input into sequential array bytes may result in data correlations between adjacent bytes as source may be sampled at a speed much slower than the Nyquist frequency of 2 times the dominant frequency components. As such, to obscure these correlations, the data is scattered through array 32 as it is collected. It should be noted that while the data may also be scattered after collection is completed, such an approach would be less efficient.

In the preferred embodiment, array 32 comprises a width and the stride having a size such that the width and the size are relatively prime. Nonetheless, the scattering function of shuffling each digital data set is accomplished by incrementing the memory array address by a number relatively prime to array size with wrap around for each sampled data set. Using a number relatively prime to the array size ensures that each array element receive precisely one data point. As such, the prime stride is selected to be approximately the square root of the array size for maximum dispersal of data points. It is also preferred that the dominant frequencies of chaotic noise source 10 be distinct from the frequency at which the address for filling array 32 wraps around.

Additionally, microprocessor 35 performs the additional algorithmic step of compressing each data set in order to "distill" the chaotic noise content. The portion of the information content, or entropy, in the data stream is generally less than the number of raw data bits associated with each data bit set. By compressing the data bits associated with each data bit set, the data is "squeezed" into a smaller space by transforming the raw data stream into a data stream that is closer in size to the theoretical minimum based on information entropy. As completely random data has entropy of one bit of entropy per bit of data, compressed data is a preferred approximation of randomness when compared with non-compressed data. Thus, compressing data prior to performing subsequent encryption is preferred as it hampers attacks based on data frequency analysis.

In the preferred embodiment, each digital data set has been shuffled prior to executing the compressing step. By performing compression on each digital data set, each number in the resultant compressed data set is a random number within a predetermined set of numbers that has an equal probability of being generated by system 5. Various compression techniques are known to one of ordinary skill in the art, such as for example PKZIP compression and UNIX compression, though Huffman encoding is preferred. Huffman encoding entails a byte by byte compression technique wherein the number of occurrences in the 8 Kbyte data input set of byte values from 0 to 255 is tallied. Each byte value is assigned a bit string, with shorter strings assigned to more frequent byte values. In the event all 256 values of the 8 bit input occur with equal probability, the data is unaffected. However, as is much more likely the case, in the event that the probability distribution of inputs is nonuniform, the Huffman encoding process substitutes a sequence of varying length bit streams for the array of byte values. It should be apparent to one of ordinary skill in the art that as the lengths of the bit strings vary in relation with the input byte probability distribution, numerous output byte values exist irrespective of the repetition of the sequence of input byte values due to undesirable correlations. As such, Huffman encoding is the preferred compression technique.

A third algorithmic step performed by microprocessor 35 is one way encrypting data set. To insure against compromise by prediction techniques, each compressed sample is one way encrypted. The step of one way encryption is performed for two essential reasons. First, encrypting the input bits insures the randomness of the resultant numbers generated by system 5. Second, performing a one way encryption step frustrates attempts to sample the random data stream for extrapolating other generated values based on attempts to model fan noise.

In the preferred embodiment, the one way encryption technique of choice is MD-5. This selection is based on several factors, including the fact that MD-5 is a one way hash function with no cryptographic key requirements. MD-5 is inherently irreversible because it reduces a 64 byte input array to a 16 byte output array, making brute force attacks based on guessing inputs impractical; one of $4=10^{115}$ inputs. As such, recovery of the original data stream is made impossible, even by the original encryptor. Moreover, MD-5 comprises a uniformly distributed probability of output bit values when given inputs with essentially any set of varying input values. It should be apparent, however, that the MD-5 approach may replaced by various other encryption methods in view of the instant disclosure, including MD-2 encryption, MD-4 encryption, SHA encryption, SNEFRU encryption, as well as other techniques apparent to one of ordinary skill in the art in view of the present invention.

To further insure the randomness of the numbers generated by system 5, in an alternate embodiment of the present invention, an additional algorithmic step is performed by microprocessor 35. Here, a portion of each compressed sample preferably, or in the alternative a portion of each data set are input to a logical exclusive OR ("XOR") gate 38 simultaneously with an independently varying, guaranteed non-repeating value, preferably the date and time of day. The output of the XOR is then one way encrypted algorithmic step by microprocessor 35. In so doing, some variation is instituted in the input of the one way encryption algorithm in the event an unintentionally repetitive data input exists. As a point of illustration, it should be apparent to one of ordinary skill in the art that simply running the time of day or a counter output through an MD-5 encryption scheme would be vulnerable to attack by someone who knows the process and guesses the time of day while looking for a matching output.

As a result of the hereinabove algorithmic steps, a one way encrypted random number output is generated by computer 20, and more particularly microprocessor 35. This output is comprises a stream of random byte values 64. Each random byte value comprises a uniform probability of distribution with respect to a predetermined range.

In still a further embodiment of the present invention, duplicate encrypted random numbers of the random byte stream generated by computer 20 are eliminated to further ensure the security of the random numbers. Here, duplicate samples in the output of computer 20 are detected by means of a comparator 40 for comparing each of random number sample with each other random number sample. It should be noted that this may also achieved within computer 20. To effectively perform this function, comparator 40 comprises a memory 42 for storing the plurality of encrypted samples. Further, a discarding device or duplicate data dump 44 is also incorporated for discarding duplicates in the plurality of encrypted random numbers. It should be noted that while the input of comparator 40 is a plurality of one way encrypted, compressed and shuffled random numbers, the output of comparator 40 comprises number set that is not random, but rather numbers with specific mathematical properties which are selected at random. This approach is of significance in the preferred applications of the instant invention wherein a unique secret identification number is placed into a remote fob transmitter for a remote keyless entry automobile system.

Figure 4:
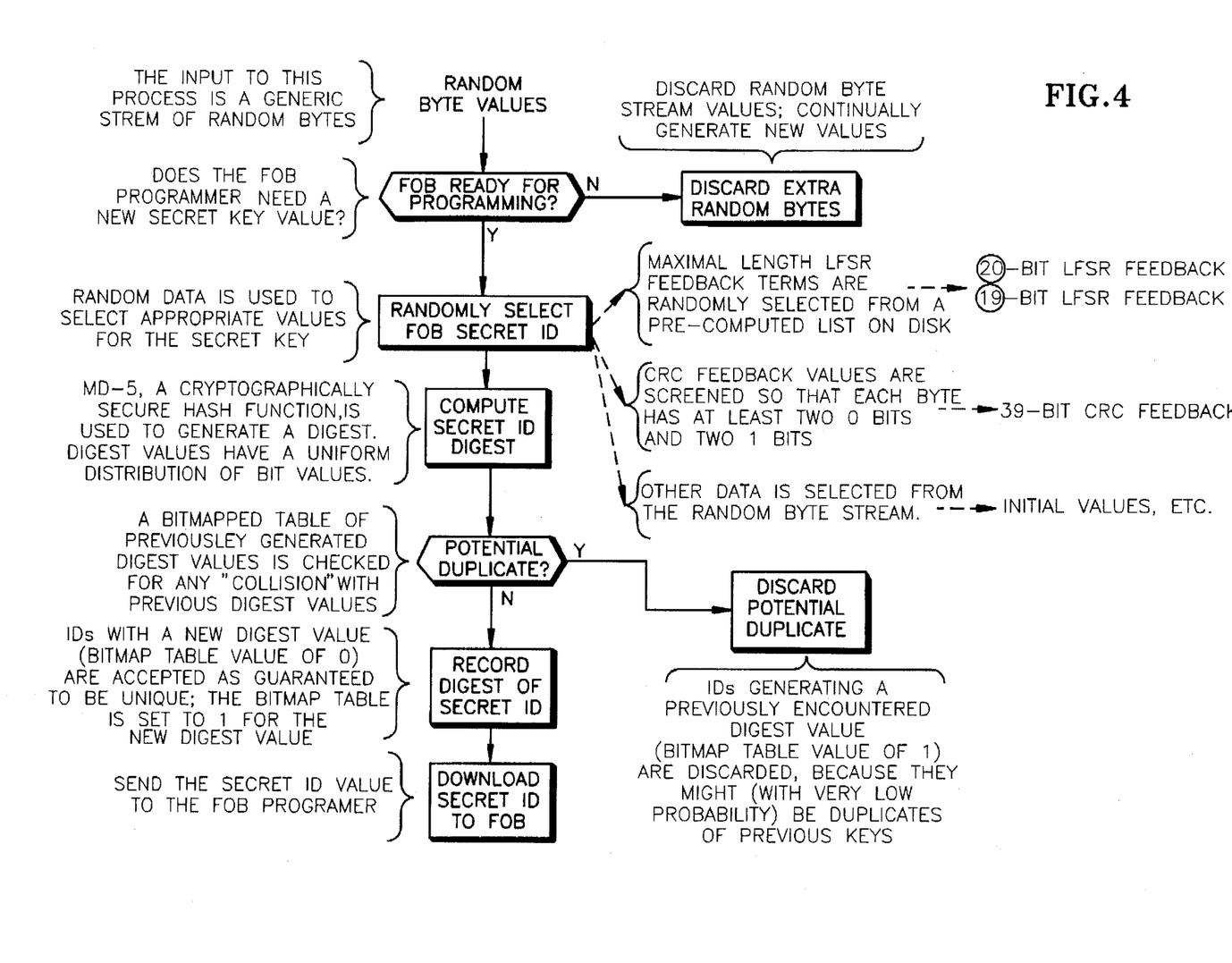
FIG. 4 illustrates a more detailed flowchart of the remaining steps of the preferred embodiment of the present invention.

Referring to FIG. 4, a flowchart of a method to convert the random byte values 64 into ID values is illustrated. With a stream of random byte values generated, several additional steps may be performed to realize a secret identification value. This is of particular significance where a secret number is required to uniquely identify a particular object, such as a keyless entry fob in the preferred embodiment, or a cellular phone for example.

The first step performed on the stream of random byte values involves a determination as to whether a secret identification number is needed. This is particularly of note in the preferred embodiment where fob transmitters are manufactured as part of a remote control keyless entry systems. Here, the fob programmer examines the present need for a secret identification number for downloading during production. In the event the programmer concludes the answer as being a negative, the random byte stream is discarded while new values are continuously generated.

However, should the programmer ascertain that a secret identification number is required, the random bytes values generated are used as a basis for creating the number. This process of creating the secret identification number is realized by utilizing the random bit stream to select actual secret identification numbers. The secret identification values generated fall within three categories: linear feedback shift register ("LFSR"), cyclic redundancy code ("CRC"), and other values.

The LFSR values are selected to correspond with maximal length feedback polynomials. These are feedback terms that, when used in an LFSR, produce sequences that cycle through all possible values except zero before repeating. Selection of both 20 bit and a 19 bit feedback terms is accomplished by using the random byte stream to randomly select an entry in a file with precomputed maximal length LFSR feedback terms.

Similarly, the CRC values are selected to correspond to feedback polynomials that have a mixture of one and zero bits. The selection criteria used is that random bytes are employed for the feedback terms, but bytes having fewer than two "one" bits or fewer than two "zero" bits are discarded. Thus, each byte of the 39 bit CRC feedback polynomials is guaranteed to have no more than 6 bits of the same value. Of course, the top polynomial bit is forced to '1' while the bit above that is set to '0' in view of the fact that the 39 bit polynomial is contained in a 40 bit set of bytes. Given that some byte values are discarded, there are $(238**5)/4$ or 190,908,292,792 possible values for the CRC feedback term, wherein the 5 represents the number of bytes with 238 possible values each, and the four corresponds with the number of constant values of the top two bits.

As for the third category of secret identification values, the other values are selected by simply using the random byte stream values. In the case of initial LFSR values, a non-zero random value is required, rejecting all zeros.

Thus, the feedback terms of a maximal length linear feedback shift register ("LFSR") are randomly selected from a pre-computed list in a memory device. This results from a 20 bit LFSR feedback and a 19 bit LFSR feedback arrangement. Moreover, a cyclic redundancy checking ("CRC") device subsequently screens feedback values using a 39 bit CRC feedback configuration such that each byte has at a least two logical 0 bits and two logical 1 bits. The remainder of the process involves selecting other data from the random byte stream as initial values. As a result, the output generated is a candidate 128 bit secret identification number. Prior to acceptance, it must be demonstrated to be unique with respect to all previously generated secret identification values.

Once the secret identification numbers are selected responsive to the random bytes values, a secret identification digest is computed. As the first step of maintaining the uniqueness of all secret identification numbers, a secure digest of the candidate secret identification number is computed. This digest comprises a 32 bit number that is deterministically computed from the 128 bit identification number in such a way as to ensure knowledge of the 32 bit digest does not reveal any useful information about the original secret identification number. As each distinct identification number can generate only one digest function, the uniqueness of the digest values are ensured which in turn assures the uniqueness of the identification values. And as a number of distinct secret identification numbers formulate the same digest values, it is thus difficult to infer which secret identification number caused any particular digest value to be generated.

The secret identification digest may be realized by performing a cryptographically secure hash function. While the MD-5 encryption method is the preferable choice, MD-2, MD-4, SHA, SNEFRU encryption processes, as well as other techniques apparent to one of ordinary skill in the art in view of the present invention may also be employed. The 16 byte identification value is padded with zeros to form a 64 byte input. MD-5 then computes a 128-bit result that is treated as four 32 bit words which are XORed together to form a 32 bit resultant digest value. This digest value is uniformly distributed over the range of a 32 bit values.

As a result of computing a secret identification digest, a bitmapped table of previously generated digest values may be checked for duplicates. It should be noted that the probability of an actual duplicate is vanishingly small. With no "twiddle factor," detailed as the value bit pattern 26 in U.S. Pat. No. 5,398,284, commonly assigned with the present invention, the possible number of combinations equal the product of the number (256) of ID byte values, the count number (255) of LFSR initializer values, the count number (2048) of LFSR feedback values, the identification number (8,355,840) of LFSR initializer values, the identification number (356,960) of LFSR feedback values, and the number (190,908,292,792) of CRC feedback values, or $7.61 \times 10e^{31}$ possible valid identification numbers.

For randomly generating values, an approximation to the expected number of identification numbers for which a single duplicate will be generated is approximately $(2V)^{1/2}$, where V is the total number of possible of identification numbers. As $7.61 \times 10e^{31}$ possible valid identification numbers exist, one duplicate is expected to be generated for every $(2 \times (7.61 \times 10e^{31}))^{1/2}$ or $1.23 \times 10e^{16}$ secret identification numbers manufactured. Thus, where an identification number is generated once per second, one duplicate will be generated every 390 million years.

However, human error, software bugs, and mechanical failure must also be considered. Thus, a duplicate checking function is performed. By checking for duplicates, a "collision" with previous digest values may be detected and discarded to insure against the possibility that two secret identification numbers are generated. This is realized by first comparing the digest value with a list of all previously generated digest values. Subsequently, new secret identification numbers having duplicate digest values are discarded. As such, identification numbers generating a previously encountered digest value having a bitmapped table value of 1 are discarded.

With potential duplicates discarded, the next identification number is input with a new digest value having a bitmap table value of 0. This unique resultant identification number then causes the bitmap table for the new digest value to be set to 1, indicating that the new identification number has been issued. By doing so, the programmer may transfer the next secret identification number to the object requiring a secret number.

Using the above process, a resultant secret identification number may be programmed into a fob transmitter in a remote keyless entry vehicular system. Once residing within the fob transmitter, a base receiver of the remote keyless entry vehicular system may be programmed with the secret identification number. By this arrangement, the secret identification number is transmitted by means of the computer only a single time to insure against compromise as is well known in the art.

While the particular invention has been described with reference to illustrative embodiments, this description is not meant to be construed in a limiting sense. It is understood that although the present invention has been described in a preferred embodiment, various modifications of the illustrative embodiments, as well as additional embodiments of the invention, will be apparent to persons skilled in the art upon reference to this description without departing from the spirit of the invention, as recited in the claims appended hereto. It is therefore contemplated that the appended claims will cover any such modifications or embodiments as fall within the true scope of the invention.

All of the U.S. Patents cited herein are hereby incorporated by reference as if set forth in their entirety.

We claim:

1. A method for generating a plurality of random numbers, the method comprising the steps of:

generating naturally occurring chaotic noise;

sampling said chaotic noise such that a plurality of samples are created; and converting each sample of said plurality into a digital data set such that each converted sample of said plurality corresponds with a random number of the plurality of random numbers.

2. The method for generating a plurality of random numbers of claim 1, further comprising the step of:

shuffling said digital data set of each converted sample of said plurality to obscure correlations between converted samples of said plurality.

3. The method for generating a plurality of random numbers of claim 1, further comprising the step of:

compressing said digital data set of each converted sample of said plurality such that the each random number of the plurality has an equal probability of being generated.

4. The method for generating a plurality of random numbers of claim 1, further comprising the step of:

one way encrypting said digital data set of each converted sample of said plurality such that said digital data of each converted sample of said plurality is prevented from being ascertained.

5. The method for generating a plurality of random numbers of claim 4, further comprising the step of:

examining said encrypted digital data sets of said converted samples of said plurality for a duplicate encrypted digital data set; and discarding said duplicate encrypted digital data set.

6. The method for generating a plurality of random numbers of claim 4, further comprising the step of:

exclusively ORing a unique perspective marker with said compressed digital data set of each converted sample of said plurality to insure the randomness of the plurality of random numbers.

7. The method for generating a plurality of random numbers of claim 1, wherein said step of generating chaotic noise comprises the step of:

generating turbulent air flow.

8. The method for generating a plurality of random numbers of claim 7, wherein said step of generating turbulent air flow comprises the step of:

operating a fan for generating said turbulent air flow.

9. The method for generating a plurality of random numbers of claim 8, wherein said step of sampling is performed at a lower frequency than said fan operates.

10. A process for generating a plurality of secure random numbers, the process comprising:

generating chaotic noise from turbulent air flow;

sampling said chaotic noise such that a plurality of samples are created;

converting each recorded sample of said plurality into digital data set such that each converted sample of said plurality corresponds with a random number of the plurality of random numbers;

shuffling said digital data set of each converted sample of said plurality such that correlations between converted samples of said plurality are obscured;

compressing each shuffled sample of said plurality such that the each random number of the plurality has an equal probability of being generated; and one way encrypting each compressed sample of said plurality such that said digital data set is prevented from being ascertained.

11. The process for generating a plurality of random numbers of claim 10, wherein said step of shuffling said digital data set comprises the step of:

positioning said digital data set of each converted sample of said plurality into a data array using a stride to reduce sampling correlations resulting from said step of sampling said chaotic noise.

12. The process for generating a plurality of random numbers of claim 11, wherein said array comprises a width and said stride comprises a size, and said width and said size being a prime number.

13. The process for generating a plurality of random numbers of claim 10, wherein said step of compressing said digital data comprises at least one of the following steps:

Huffman encoding said shuffled digital data set of each converted sample of said plurality;

PKZIP compressing said shuffled digital data set of each converted sample of said plurality; and UNIX compressing said shuffled digital data set of each converted sample of said plurality.

14. The process for generating a plurality of random numbers of claim 10, wherein said step of one way encrypting said digital data comprises at least one of the following step:

MD-2 encrypting each compressed sample of said plurality;

MD-4 encrypting each compressed sample of said plurality;

MD-5 encrypting each compressed sample of said plurality;

SHA encrypting each compressed sample of said plurality; and

SNEFRU encrypting each compressed sample of said plurality.

15. The process for generating a plurality of random numbers of claim 10, further comprising the step of:

examining each encrypted sample of said plurality for a duplicate encrypted sample; and discarding said duplicate encrypted sample to insure the uniqueness of each random number of the plurality.

16. The process for generating a plurality of random numbers of claim 10, further comprising the step of:

exclusively ORing a unique perspective marker with said compressed digital data set of each converted sample of said plurality to insure the randomness of the plurality of random numbers.

17. The process for generating a plurality of random numbers of claim 16, wherein said unique perspective marker comprises a time of day stamp.

18. The process for generating a plurality of random numbers of claim 10, wherein said step of generating chaotic noise from turbulent air flow comprises the step of:

operating a fan for generating said turbulent air flow.

19. The process for generating a plurality of random numbers of claim 18, wherein said step of sampling is performed at a lower frequency than said fan operates.

20. A system for generating a plurality of random numbers, the system comprising:

a chaotic noise generator for generating chaotic noise;

a sampling device for sampling said chaotic noise such that a plurality of samples are created;

a digitizer for converting each sample of said plurality into a digital data set; and a computer for shuffling said digital data set of each converted sample of said plurality, for compressing said digital of said each converted sample of said plurality, and for one way encrypting said digital data set of each converted sample of said plurality, such that each converted sample of said plurality corresponds with a random number of the plurality of random numbers.

21. The system for generating a plurality of random numbers of claim 20, wherein said computer comprises a data array for receiving said digital data set of each converted sample of said plurality using a stride to reduce sampling correlations resulting from said sampling of said chaotic noise by said sampling device.

22. The system for generating a plurality of random numbers of claim 21, wherein said array comprises a width and said stride comprises a size, and said width and said size being a prime number.

23. The system for generating a plurality of random numbers of claim 20, wherein said computer comprises at least one of the following:

a Huffman encoder for compressing each converted sample of said plurality;

a PKZIP compressing device for compressing each converted sample of said plurality; and a UNIX compressing device for compressing each converted sample of said plurality.

24. The system for generating a plurality of random numbers of claim 20, wherein said computer comprises at least one of the following:

an MD-2 encryption device for encrypting said digital data set of each converted sample of said plurality;

an MD-4 encryption device for encrypting said digital data set of each converted sample of said plurality;

an MD-5 encryption device for encrypting said digital data set of each converted sample of said plurality;

an SHA encryption device for encrypting said digital data set of each converted sample of said plurality; and a SNEFRU encryption device for encrypting said digital data set of each converted sample of said plurality.

25. The system for generating a plurality of random numbers of claim 20, wherein said computer further comprises:

a comparing device for comparing each of said one way encrypted digital data sets of said converted samples of said plurality; and a discarding device for discarding a duplicate encrypted digital data set from each of said one way encrypted digital data sets.

26. The system for generating a plurality of random numbers of claim 20, wherein said computer comprises:

a logical exclusive OR gate for exclusively ORing a unique perspective marker with said compressed digital data set of each converted sample of said plurality to insure the randomness of the plurality of random numbers.

27. The system for generating a plurality of random numbers of claim 26, wherein said unique perspective marker comprises a time of day stamp.

28. The system for generating a plurality of random numbers of claim 20, wherein said chaotic noise generator for generating chaotic noise comprises an operating a fan for generating said turbulent air flow.

29. The system for generating a plurality of random numbers of claim 20, wherein said sampling device samples said chaotic noise at a lower frequency than said chaotic noise generator operates for generating said turbulent air flow.

* * * * *